R. HOYT.
MEASURING APPARATUS.
APPLICATION FILED JULY 20, 1904.

928,658.

Patented July 20, 1909.
4 SHEETS—SHEET 4.

WITNESSES:
Edward Thorpe.
S. H. Cobb.

INVENTOR
Roscoe Hoyt
BY
Munn
ATTORNEYS

UNITED STATES PATENT OFFICE.

ROSCOE HOYT, OF NEW YORK, N. Y.

MEASURING APPARATUS.

No. 928,658.  Specification of Letters Patent.  Patented July 20, 1909.

Application filed July 20, 1904. Serial No. 217,365.

*To all whom it may concern:*

Be it known that I, ROSCOE HOYT, a citizen of the United States, and a resident of the city of New York, borough of Brooklyn, in the county of Kings and State of New York, have invented a new and Improved Measuring Apparatus, of which the following is a full, clear, and exact description.

My invention relates to apparatus for measuring various materials, it being particularly useful in connection with packing-machines in which it is desired that a measure by weight shall be quickly made and with substantial accuracy.

Its principal objects are to provide a convenient automatic machine for such purposes.

It consists in the various features and combinations hereinafter described and claimed.

Reference is to be had to the accompanying drawings forming a part of this specification, in which similar characters of reference indicate corresponding parts in all the figures.

Figure 1:
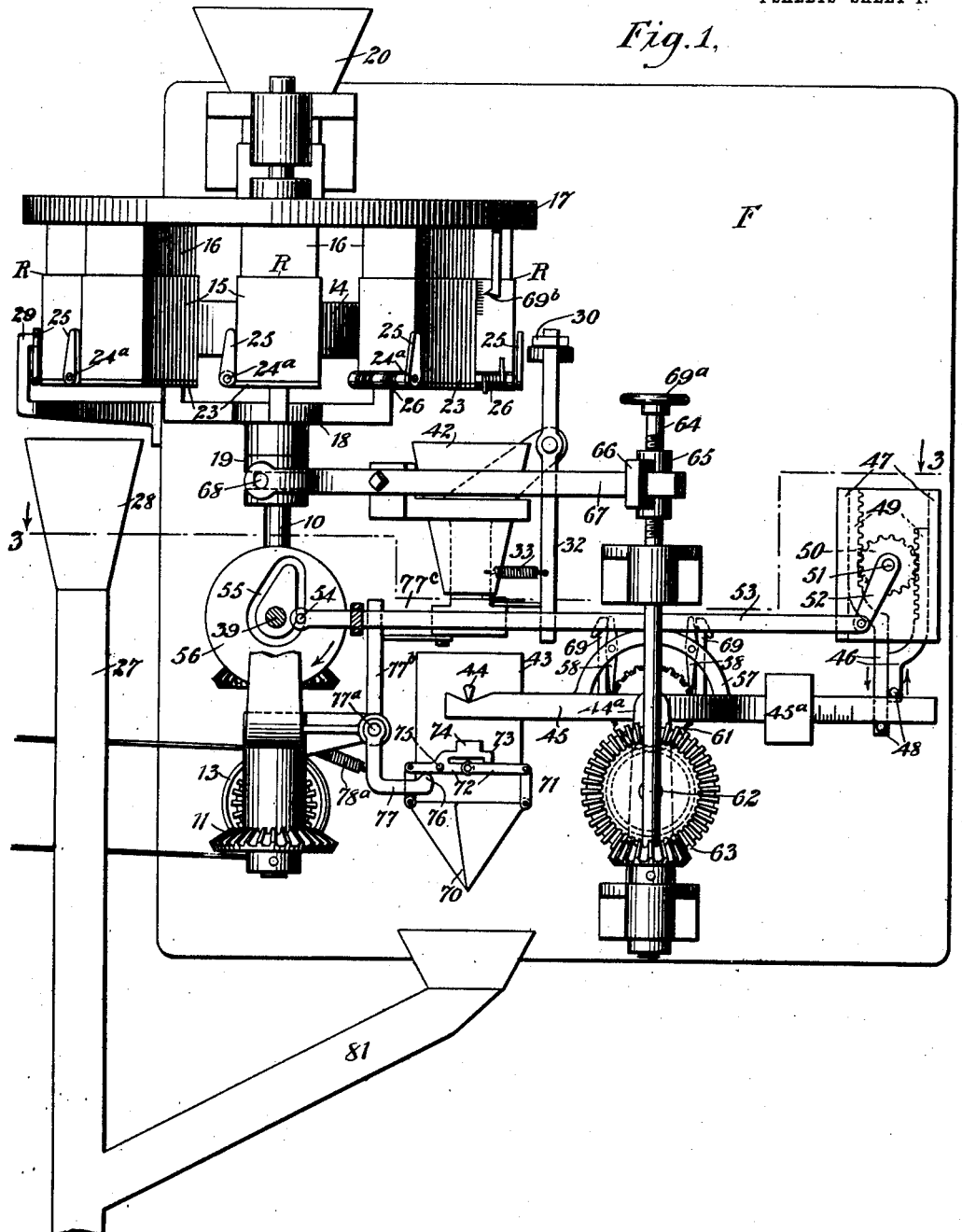
Figure 2:
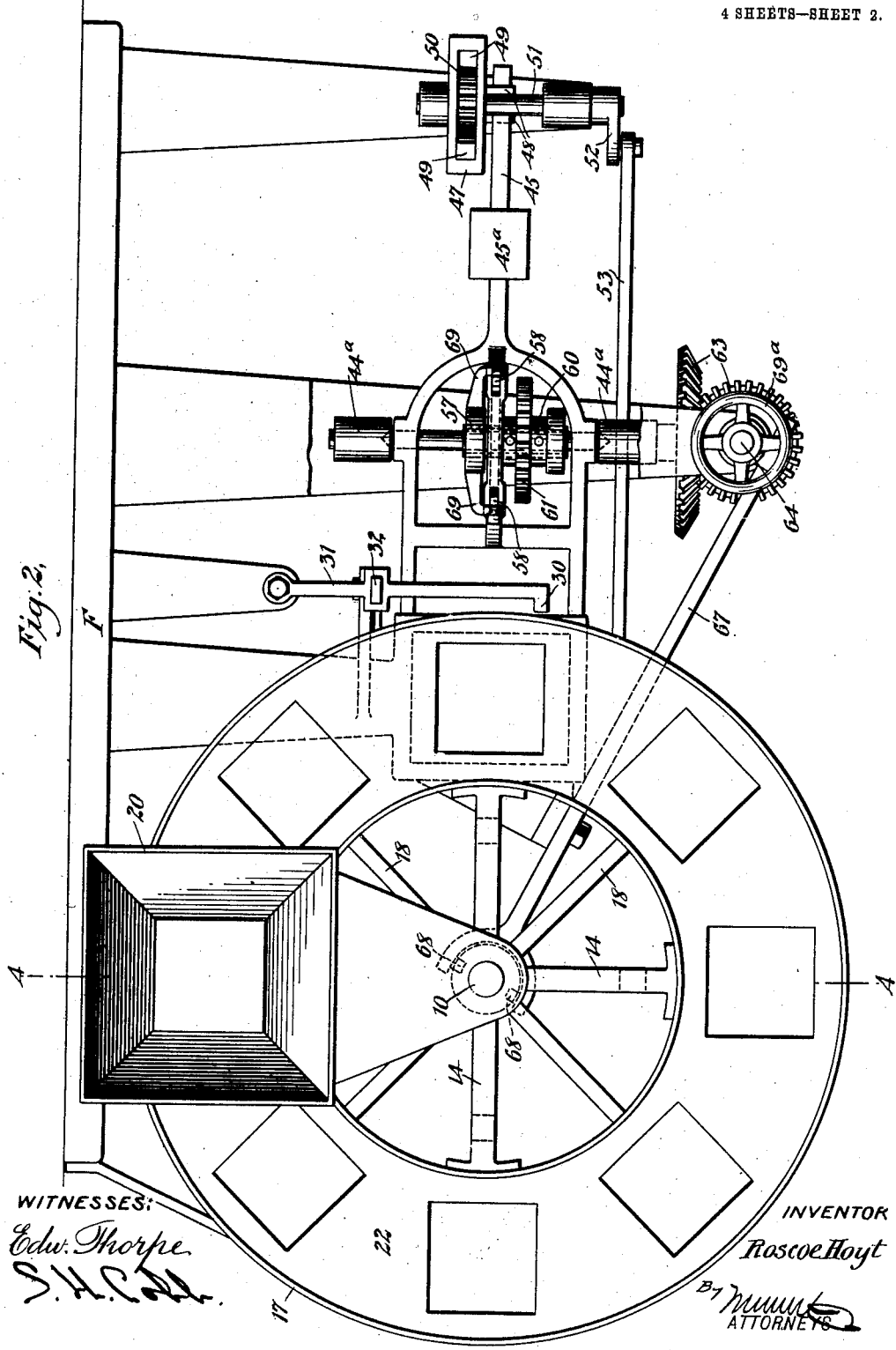
Figure 3:
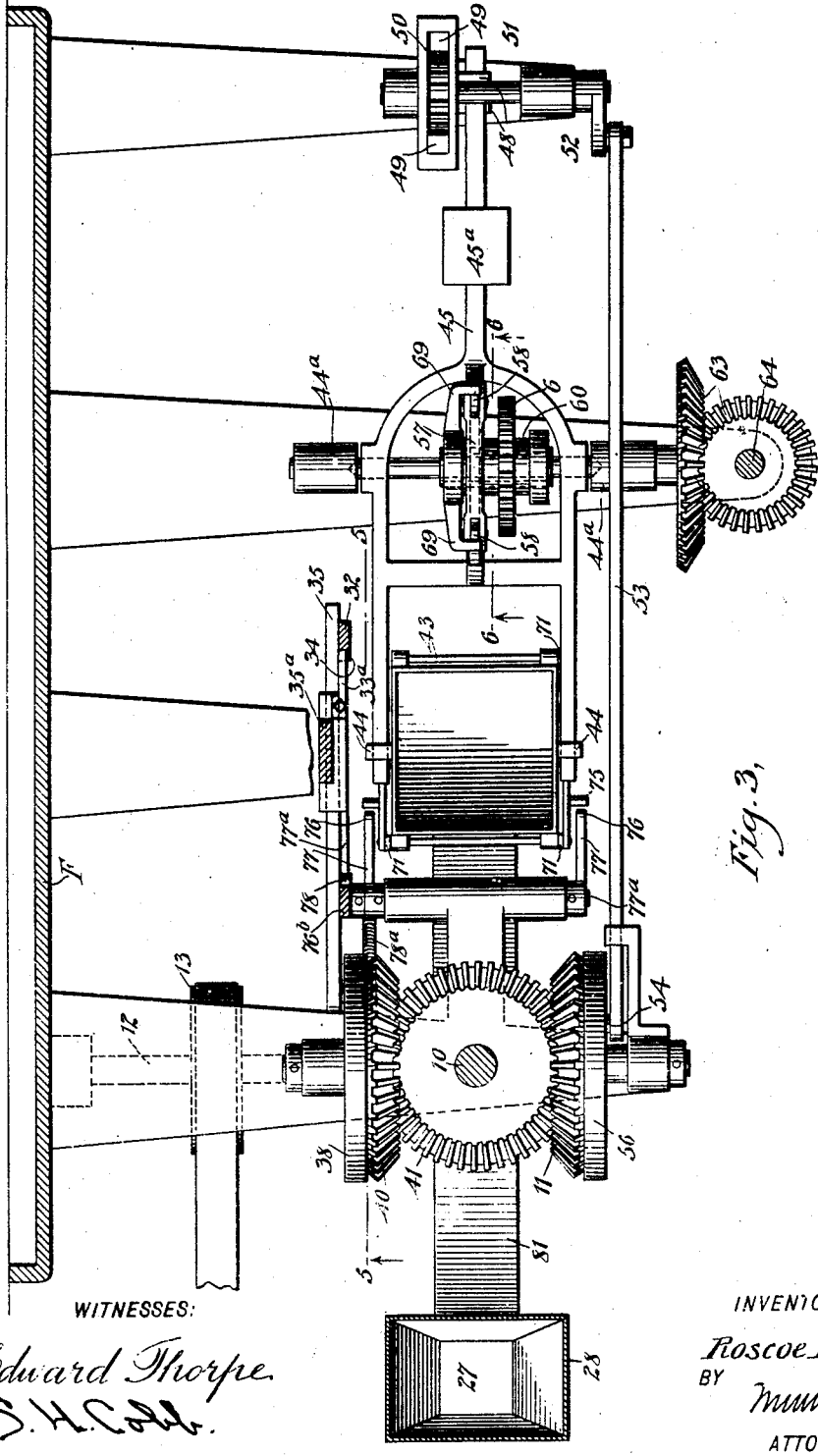
Figure 4:
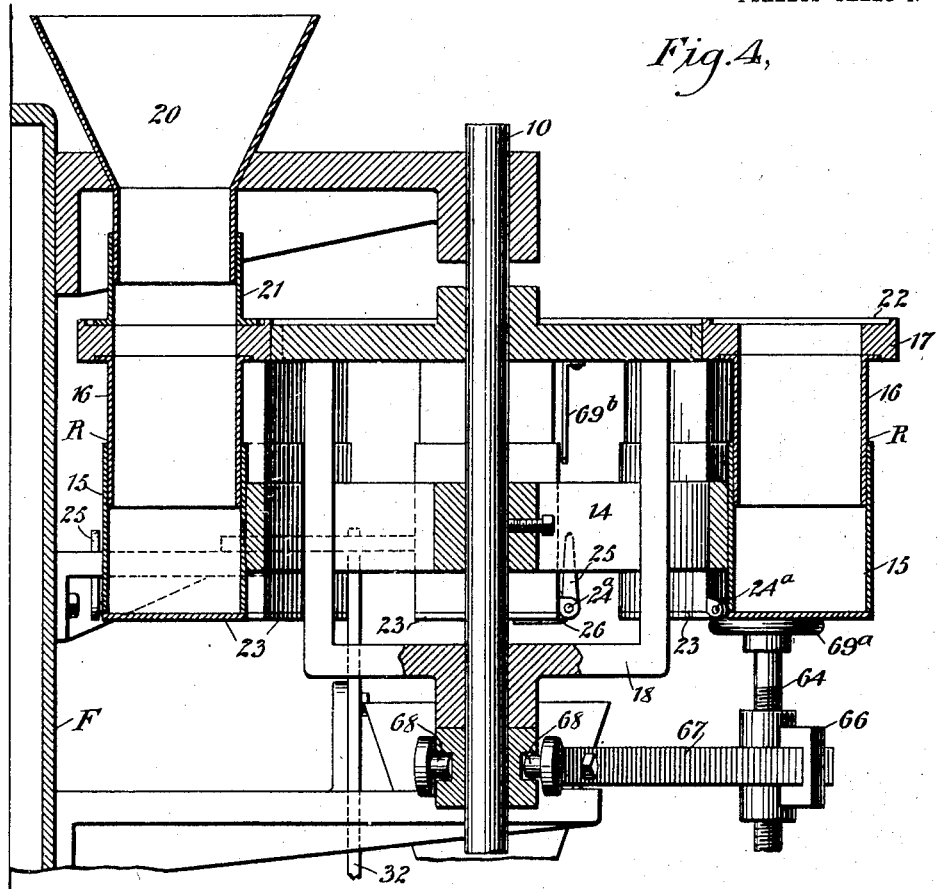
Figure 5:
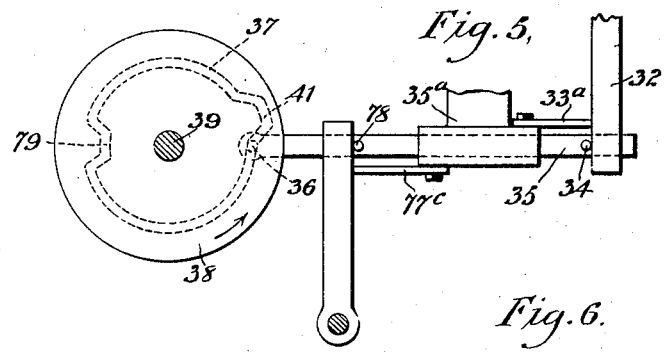
Figure 6:
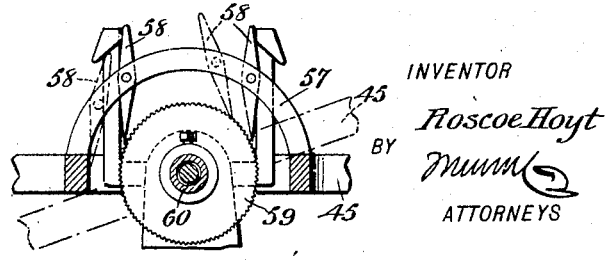

Figure 1 is a side elevation of one embodiment of my invention; Fig. 2 is an enlarged top plan view thereof; Fig. 3 is an enlarged horizontal section on the line 3—3 of Fig. 1; Fig. 4 is a transverse section on the line 4—4 of Fig. 2; Fig. 5 is a detail in side elevation of the actuating mechanism for effecting the discharge from the measuring and weighing-receptacles; and Fig. 6 is a sectional detail through the ratchet mechanism.

F designates a frame of suitable form to support the various elements of the machine, and in this frame is journaled a main or supporting-shaft 10. This shaft occupies a vertical position and is connected by bevel gearing 11 with a horizontal shaft 12, upon which is a pulley 13. Power may be applied to this pulley from any desired source to operate the apparatus. Fast upon the shaft is a spider 14, at the ends of the arms of which are carried lower sections 15 of revoluble measuring receptacles R, here shown as eight in number. Moving in these lower sections, conveniently telescoping therein, are upper sections 16, which are connected by a plate 17 movable longitudinally upon the shaft. To this plate are attached arms of a spider 18 extending between the arms of the spider 14 and resting upon a collar 19 which may be reciprocated on the shaft, as will be hereinafter described. Fixed above the plate 17 is a hopper 20 having movable over its downwardly-projecting throat a spout 21, the lower end of which operates in an annular groove 22 extending about the plate, the relation between the end of this spout and the openings of the upper sections of the receptacles being such that the latter are successively brought into alinement with the former during the rotation of the shaft.

At the bottom of each receptacle is shown a gate 23, preferably hinged at one side of the lower section upon a shaft 24ª, which carries at its outer end an arm 25 and has surrounding it a spring 26 serving to hold the gate normally closed. Beneath the path of the receptacles is situated a conduit 27 leading to any desired point and having at its upper end a flaring mouth 28, which is preferably somewhat elongated in the direction of rotation of the receptacles, thus increasing the time during which their discharge may take place. Projecting from the frame at a point above the mouth of the conduit is a fixed contact member 29, against which the arms 25 may strike to swing the gates, for the purpose of discharging the contents of the receptacles.

Separated from the contact member 29, here shown as by a space equal to that between alternate receptacles, is a movable contact member 30 extending from the end of an arm 31 pivoted upon the frame. Engaging an opening in this arm is the upper end of a lever 32 fulcrumed upon the frame, and preferably held by a suitably connected spring 33 against a convenient stop 33ª and in coaction with a projection 34 from a bar 35 mounted to slide in a guide 35ª. At the opposite extremity of the bar is a pin 36 extending into a cam groove 37 formed in a disk 38. This disk is fixed upon a shaft 39 and is rotated by a bevel gear 40 meshing with a similar gear 41 upon the shaft 10. From the groove is a projecting portion 41' which moves the bar to the right (see particularly Fig. 5) and swings the lever 32 to bring the movable contact member into the path of the receptacle-arm. The ratio of the gearing which drives the cam-disk is such that the movement of this contact member occurs at a time differing from a complete revolution of the receptacles by an amount necessary for an odd number of the receptacles to pass, as, for example, seven-eighths of a revolution, or one and one-eighth revolutions. This results in the opening of the gate by the movable contact member of a different receptacle for each rotation of the shaft.

Below the point at which the contact member 30 opens the gates, is situated a hopper 42 directing the discharged material to a weighing-receptacle 43, which is shown as provided with knife-edged trunnions 44 resting in depressions in the opposite arms of a beam 45 of scale mechanism. This beam is pivoted upon brackets 44ª carried by the frame and has moving upon it the usual weight 45ª with an associated scale. The beam is moved to its normal horizontal position and there automatically locked by vertical bars or members 46 sliding in guides 47. At the lower ends of these bars are projections or pins 48 situated above and below the beam, and on the inner side of each bar is a rack 49, with both of which meshes a pinion 50 fixed upon a shaft 51 rotatably mounted in the frame. At the outer extremity of this shaft is an arm 52, to which is connected a link 53 having at its outer end a pin 54 operating in a cam-groove 55 formed in a disk 56. This disk is preferably rotatable with the shaft 39.

The form and angular position of the cam-groove 55 is such that, after a charge of the material has been deposited in the weighing-receptacle, the pinion is rotated to move both of the bar-projections from the scale-beam, thus leaving it free for the weighing operation. When this has been completed, the bars are simultaneously moved in the opposite direction, returning the scale-beam to its normal horizontal position. Rising above the beam is a sector 57, upon which are pivoted opposite pawls 58, which may coact with a ratchet-wheel 59 fixed upon a sleeve 60 journaled in the frame and surrounding the pivot-shaft of the scale-beam. This sleeve may be connected by spur gearing 61 with a suitably journaled horizontal shaft 62, which in turn is connected by bevel gearing 63 with a vertical shaft 64. Upon the shaft 64 is a threaded portion, over which operates a nut 65 having a laterally-projecting perforated lug 66, which is engaged by a lever 67 The opposite end of the lever is bifurcated and provided with inwardly-projecting pins 68 extending into a groove in the collar 19.

The relation of the pawls to the ratchet-wheel is such that when the scale-beam occupies a horizontal position, they are both out of contact with the ratchet-teeth; but if the beam tilts in either direction, one of them will be moved away from the edge of the ratchet-wheel, while the other will swing into coaction with it, as is clearly illustrated in Fig. 6. When it is returned to its normal position by the bars 46, the upper pawl, engaging the ratchet-teeth, rotates the vertical shaft through the intermediate gearing, which results in the nut moving longitudinally on the shaft. This raises or lowers the spider 18 and moves the upper receptacle-sections to vary their capacity. Before the return of the beam has been completed, the upper end of the active pawl comes into contact with a stop-arm 69, of which there are two projecting from the frame at each side of the sector. This insures the disengagement of the pawl from the ratchet-teeth at the end of its operation. The upper extremity of the shaft 64 is preferably provided with a hand-wheel 69ª, by which a manual adjustment of the relations of the sections may be secured, and as a guide for this movement, one of the receptacles may carry upon its sections an associated scale and index 69ᵇ.

The bottom portion of the weighing-receptacle, as here illustrated, is closed by opposite hinged flaps 70 which may be of pyramidal form, and from the outer extremities of which project arms 71 connected by pairs of toggle-arms 72, 72. One of each of these pairs of arms is extended over its companion at 73 and contacts therewith to limit the downward movement of the toggle and the closing of the flaps. This closing may be brought about by the weight of said flaps and of an enlargement 74 formed upon the extensions. The flaps may be separated to permit the outflow of the contents of the weighing-receptacle by pins 75, with which coöperate the rounded ends 76 of arms 77 secured at the ends of a suitably supported shaft 77ª. The arms may be swung into contact with the pins by an operating arm 77ᵇ, which is held against a suitable stop 77ᶜ and in co-action with a pin or projection 78 from the bar 35 by a spring 78ª. The contact between this arm and projection occurs at the opposite side from that of the pin 34 and its associated lever, so that no movement results from the reciprocation of the bar by the projecting portion 41 of the cam groove. At another point in the groove, however, is a suitably formed projection 79 which produces an opposite reciprocation of the bar, which swings the ends of the arms 77 into contact with the pins upon the arms 72, breaking the toggle and separating the flaps to permit the contents of the weighing-receptacle to escape. The discharge is received by a conduit 81 which leads into the main conduit 27. This discharge from the weighing-receptacle is so timed by properly arranging the projecting portion of the cam-groove that it occurs when the previously emptied measuring receptacle is passing the conduit 27, thus preventing any interruption in the continuous delivery of the charges.

In the use of the apparatus, the receptacles may be adjusted by the hand wheel upon the vertical shaft and the index and scale 69ᵇ to give them a capacity which will enable them to contain the desired weight of material. The main shaft is now rotated and the material continuously supplied through the feed hopper, which will result in each of the receptacles being filled as it passes beneath the connecting spout. When the proper receptacle reaches the hopper delivering to the weighing-receptacle, the movable contact member will be carried into the path of the gate-arms by the projections 41ª, causing the gate to be opened. The contents will fall into the weighing-receptacle, whereupon the scale-beam will be automatically released by the separation of the locking-bars. If the charge is of the correct weight, the beam will remain in a horizontal position and there will be no variation in the relation of the receptacle-sections. If, however, the charge is too light or too heavy, the beam will swing in one direction or the other, bringing one of the pawls into such a position that, upon the return of the beam to the horizontal by the locking members, it will rotate the threaded shaft and cause the nut thereon to be fed along it, and as a consequence the receptacle-sections move with relation to one another to increase or diminish their capacity by the proper amount. After this has occurred, the companion projection from the cam-groove operates to release the contents of the weighing-receptacle, which falls into the branch of the conduit. Between these discharges of the weighing-receptacle the measuring-receptacles will have been successively depositing their contents in the main conduit, their releasing-arms having been actuated by the fixed contact member. These operations of measuring, weighing and correcting the capacity of the measuring-receptacles, and the delivery of the charges to the conduits go on continuously without manual intervention. Thus it will be seen that while my improved apparatus measures the charges of material much more rapidly than would be possible if each were weighed, nevertheless any departure from the desired weight which might result from changes in the condition of the material and the like will be automatically corrected.

Having thus described my invention, I claim as new and desire to secure by Letters Patent:—

1. The combination with a variable measuring-receptacle, of weighing mechanism to which the receptacle may deliver, and means automatically controlled by the weighing mechanism for varying the capacity of the receptacle.

2. The combination with a plurality of variable measuring-receptacles, of weighing mechanism to which the receptacles successively deliver, and means automatically controlled by the weighing mechanism for simultaneously varying the capacity of all the receptacles.

3. The combination with a variable measuring-receptacle, of weighing mechanism to which the receptacle may deliver, means for locking the weighing mechanism in its normal position, and means automatically controlled by the weighing mechanism for varying the capacity of the receptacle.

4. The combination with a variable measuring-receptacle, of weighing mechanism to which the receptacle may deliver, means for locking the weighing mechanism in its normal position, and means automatically controlled by the weighing mechanism during its return to the normal position for varying the capacity of the receptacle.

5. The combination with a variable measuring-receptacle, of weighing mechanism to which the receptacle may deliver, automatic means for locking the weighing mechanism in its normal position, and means automatically controlled by the weighing mechanism for varying the capacity of the receptacle.

6. The combination with a measuring-receptacle having sections movable relatively to one another to vary the capacity of the receptacle, of a scale-beam, a weighing-receptacle carried by the scale-beam, means for delivering the contents of the measuring-receptacle to the weighing-receptacle, and means for utilizing the movement of the beam to transmit movement to one of the measuring-receptacle sections.

7. The combination with a measuring-receptacle having sections movable relatively to one another, of a scale-beam, a weighing-receptacle carried by the scale-beam, means for delivering the contents of the measuring-receptacle to the weighing-receptacle, oppositely moving members coacting with the beam to return it to its normal position, and means for transmitting the movement of the beam under the influence of the members to one of the measuring-receptacle sections.

8. The combination with a measuring-receptacle having sections movable relatively to one another, of a scale-beam, a weighing-receptacle carried by the scale-beam, means for delivering the contents of the measuring-receptacle to the weighing-receptacle, means for transmitting the movement of the beam to one of the measuring-receptacle sections, and automatic means for discharging the weighing-receptacle.

9. The combination with a measuring-receptacle having sections movable relatively to one another, of a scale-beam, a weighing-receptacle carried by the scale-beam, means for delivering the contents of the measuring-receptacle to the weighing-receptacle, and means for transmitting the movement of the beam to one of the measuring-receptacle sections, including a ratchet-wheel connected with the movable section and pawls carried by the scale-beam and coöperating with the ratchet-wheel.

10. The combination with a measuring-receptacle having sections movable relatively to one another, of a scale-beam, a weighing-receptacle carried by the scale-beam, means for delivering the contents of the measuring-receptacle to the weighing-receptacle, means for transmitting the movement of the beam to one of the measuring-receptacle sections, including a ratchet-wheel connected with the movable section and pawls carried by the scale-beam and coöperating with the ratchet-wheel, and stops with which the pawls may contact.

11. In a measuring apparatus, the combination with a receptacle-section, of a second section movable with relation thereto, a lever connected with the movable section, a nut engaging the lever, a threaded shaft coacting with the nut, scale mechanism to which the receptacle delivers, and means for connecting the scale mechanism and threaded shaft.

12. In a measuring apparatus, the combination with a receptacle-section, of a second section movable with relation thereto, a lever connected with the movable section, a nut engaging the lever, a threaded shaft coacting with the nut, scale mechanism to which the receptacle delivers, and ratchet mechanism for connecting the scale mechanism and threaded shaft.

13. In a measuring apparatus, the combination with a receptacle-section, of a second section movable with relation thereto, a lever connected with the movable section, a nut engaging the lever, a threaded shaft coacting with the nut, a hand-wheel carried by said shaft, scale mechanism to which the receptacle delivers, and means for connecting the scale mechanism and threaded shaft.

14. In a measuring apparatus, the combination with a receptacle-section, of a second section movable with relation thereto, said sections being provided with a scale and index, a lever connected with the movable section, a nut engaging the lever, a threaded shaft coacting with the nut, a hand-wheel carried by said shaft, scale mechanism to which the receptacle delivers, and means for connecting the scale mechanism and threaded shaft.

15. In a measuring apparatus, the combination with a revoluble receptacle-section, of a second section revolving therewith and movable independently thereof, a gate controlling the delivery from the receptacle, means for operating the gate, weighing mechanism connected with the independently movable section, and independent means for operating the gate for delivery to the weighing mechanism.

16. In a measuring apparatus, the combination with a plurality of revoluble receptacle-sections, of an independently movable section revoluble with each of the first-named sections, gates controlling the delivery from the receptacles, fixed means for operating the gates, weighing mechanism connected with the independently movable sections, and movable means for operating the gates for delivery to the weighing mechanism.

17. In a measuring apparatus, the combination with a plurality of revoluble receptacle-sections, of an independently movable section revoluble with each of the first-named sections, gates controlling the delivery from the receptacles, fixed means for operating the gates, weighing mechanism connected with the independently movable sections, with the independently movable sections, movable means for operating the gates for delivery to the weighing mechanism, means for discharging the weighing mechanism, a conduit receiving the contents of the receptacle when operated by the fixed means, and a conduit connected therewith and receiving the discharge from the weighing mechanism.

18. In a measuring apparatus, the combination with a plurality of revoluble receptacle-sections, of an independently movable section revoluble with each of the first-named sections, gates controlling the delivery from the receptacles, fixed means for operating the gates, weighing mechanism connected with the independently movable sections, means for operating the gates for delivery to the weighing mechanism, and automatic means for intermittently moving said operating means.

19. The combination with a plurality of continuously-rotatable measuring receptacles, of means for adjusting the capacity of said receptacles, an intermittently-movable weighing mechanism, and means for automatically controlling the capacity-adjusting means by the weighing mechanism.

20. In a measuring apparatus, the combination with a rotatable shaft, of a plurality of receptacle-sections secured thereto, a section movable in each of those first named, a plate connecting the second sections and having at its outer face an annular groove, a fixed feed-hopper, and a spout movable upon the hopper and extending into the plate-groove.

21. The combination with variable measuring means, of weighing mechanism to which the measuring means may deliver, and means automatically controlled by the weighing mechanism for varying the measuring means.

In testimony whereof I have signed my name to this specification in the presence of two subscribing witnesses.

ROSCOE HOYT.

Witnesses:
 JNO. M. RITTER,
 SYLVANUS H. COBB.